US010289684B2

(12) United States Patent
Mashtizadeh et al.

(10) Patent No.: US 10,289,684 B2
(45) Date of Patent: May 14, 2019

(54) LIVE MIGRATION OF VIRTUAL MACHINE PERSISTENT DATA USING MIRRORED INPUT-OUTPUT OPERATIONS

(75) Inventors: Ali Mashtizadeh, El Cerrito, CA (US); Swathi Koundinya, Sunnyvale, CA (US)

(73) Assignee: VMware, Inc., Palo Alto, CA (US)

( * ) Notice: Subject to any disclaimer, the term of this patent is extended or adjusted under 35 U.S.C. 154(b) by 883 days.

(21) Appl. No.: 13/099,639

(22) Filed: May 3, 2011

(65) Prior Publication Data
US 2012/0284234 A1 Nov. 8, 2012

(51) Int. Cl.
*G06F 17/30* (2006.01)
(52) U.S. Cl.
CPC .............................. *G06F 17/30079* (2013.01)
(58) Field of Classification Search
CPC ....................................................... G06F 3/0647
USPC .......................................................... 707/610
See application file for complete search history.

(56) References Cited

U.S. PATENT DOCUMENTS

| 8,914,540 B1* | 12/2014 | Barooah | G06F 3/0607 709/238 |
| 2005/0076041 A1* | 4/2005 | Stakutis | G06F 17/30106 |
| 2007/0016754 A1* | 1/2007 | Testardi | G06F 3/0611 711/206 |
| 2007/0192375 A1* | 8/2007 | Nakatani | G06F 11/1662 |
| 2008/0235482 A1* | 9/2008 | Armstrong et al. | 711/173 |
| 2009/0037679 A1* | 2/2009 | Kaushik | G06F 3/0617 711/162 |
| 2009/0064136 A1* | 3/2009 | Dow | G06F 9/4856 718/1 |
| 2010/0153341 A1* | 6/2010 | Driesen | G06F 17/303 707/661 |
| 2010/0205392 A1* | 8/2010 | Schnapp et al. | 711/162 |
| 2011/0197039 A1* | 8/2011 | Green | G06F 3/0617 711/162 |
| 2011/0219208 A1* | 9/2011 | Asaad | G06F 15/76 712/12 |
| 2012/0030306 A1* | 2/2012 | Kami | 709/213 |
| 2012/0278572 A1* | 11/2012 | Broido et al. | 711/162 |

OTHER PUBLICATIONS

Christopher Clark et al., "Live Migration of Virtual Machines", University of Cambridge Computer Laboratory, Department of Computer Science, 14 pages (2005).

* cited by examiner

*Primary Examiner* — Boris Gorney
*Assistant Examiner* — Griselle C Roland
(74) *Attorney, Agent, or Firm* — Loza & Loza, LLP

(57) ABSTRACT

Persistent data, such as disks associated with virtual machines, are migrated between and across data stores using mirrored input-output operations (IOs). The migration technique employs a data mover to copy selected regions of the virtual machine disk to a target data store while the virtual machine is executing. If the virtual machine issues a write IO, the write IO is selectively mirrored on the target data store depending on whether or not the write IO is in a region of the virtual machine disk that has already been copied.

19 Claims, 6 Drawing Sheets

LIVE MIGRATION OF VIRTUAL MACHINE PERSISTENT DATA USING MIRRORED INPUT-OUTPUT OPERATIONS

BACKGROUND

In a process known as live migration of virtual machines (VMs), a VM's runtime state can be moved without disruption or downtime to a different physical host. Live migration of VMs is essential for increasing the mobility of virtual machines and improving resource utilization in a data center. In addition, techniques have been developed for system administrators to migrate persistent data of a VM, e.g., its virtual disks, between or across data stores with no significant disruption or downtime. This enables efficient and flexible storage management in a virtual infrastructure, such as array migration, storage upgrade, and dynamic optimization of storage performance.

One technique for migrating persistent data of a VM between or across data stores with very little disruption or downtime is described in U.S. patent application Ser. No. 12/184,134, filed Feb. 9, 2009 and entitled, "Online Virtual Machine Disk Migration," the entire contents of which is incorporated by reference herein. In this technique, redo logs are employed to store copies of those blocks of a VM's persistent data that have changed while the migration process is being carried out iteratively. Each redo log stores copies of the changed blocks during one iteration of the migration process and is copied over to the destination at the end of the iteration. The migration process is completed by pausing the VM and merging the redo logs at the destination with an initial copy of the VM's persistent data that was created at the destination at the beginning of the migration process.

One of the drawbacks of the redo log approach is that the virtual machine whose persistent data is being migrated uses two different data stores to store its persistent data while the process is ongoing. This is undesirable because relying on two data stores increases vulnerability of the virtual machine during data migration in that a crash of either the source data store or the destination data store will become a failure condition.

Another drawback of the redo log approach is the size of the redo logs. If the VM has a lot of write activity during the migration process, the redo logs can become quite large in size and consume extra storage capacity. Further, if the redo logs are large in size, the final step of merging the redo logs with the initial copy of the VM's persistent data, which is carried out while the VM is paused, may take too long and result in VM downtime.

SUMMARY

One or more embodiments of the present invention provide techniques for migrating persistent data, such as persistent data associated with virtual machines, between and across data stores using mirrored input-output operations (IOs). The techniques described herein improve upon conventional techniques in that they completely eliminate VM downtime.

A method of migrating contents of persistent storage from a source object to a destination object, according to an embodiment of the present invention, includes the steps of selecting a region of the source object to be copied, copying the selected region to the destination object, and repeating the selecting step and the copying step until all regions of the source object have been copied to the destination object. If a write IO is issued to the source object while the migration is being carried out, the write IO is selectively mirrored on the destination object depending on whether or not the write IO is in a region of the source object that has already been copied to the destination object.

In one embodiment, the source object is a first file representing a virtual disk of a virtual machine and the destination object is a second file to which the contents of the first file are to be copied. In addition, the method further comprises the step of performing an atomic switchover of the virtual disk of the virtual machine from the source object to the destination object after all regions of the source object have been copied to the destination object.

Further embodiments of the present invention provide a non-transitory computer readable storage medium that includes instructions for causing a computer system to carry out the method set forth above.

DETAILED DESCRIPTION

Figure 1:
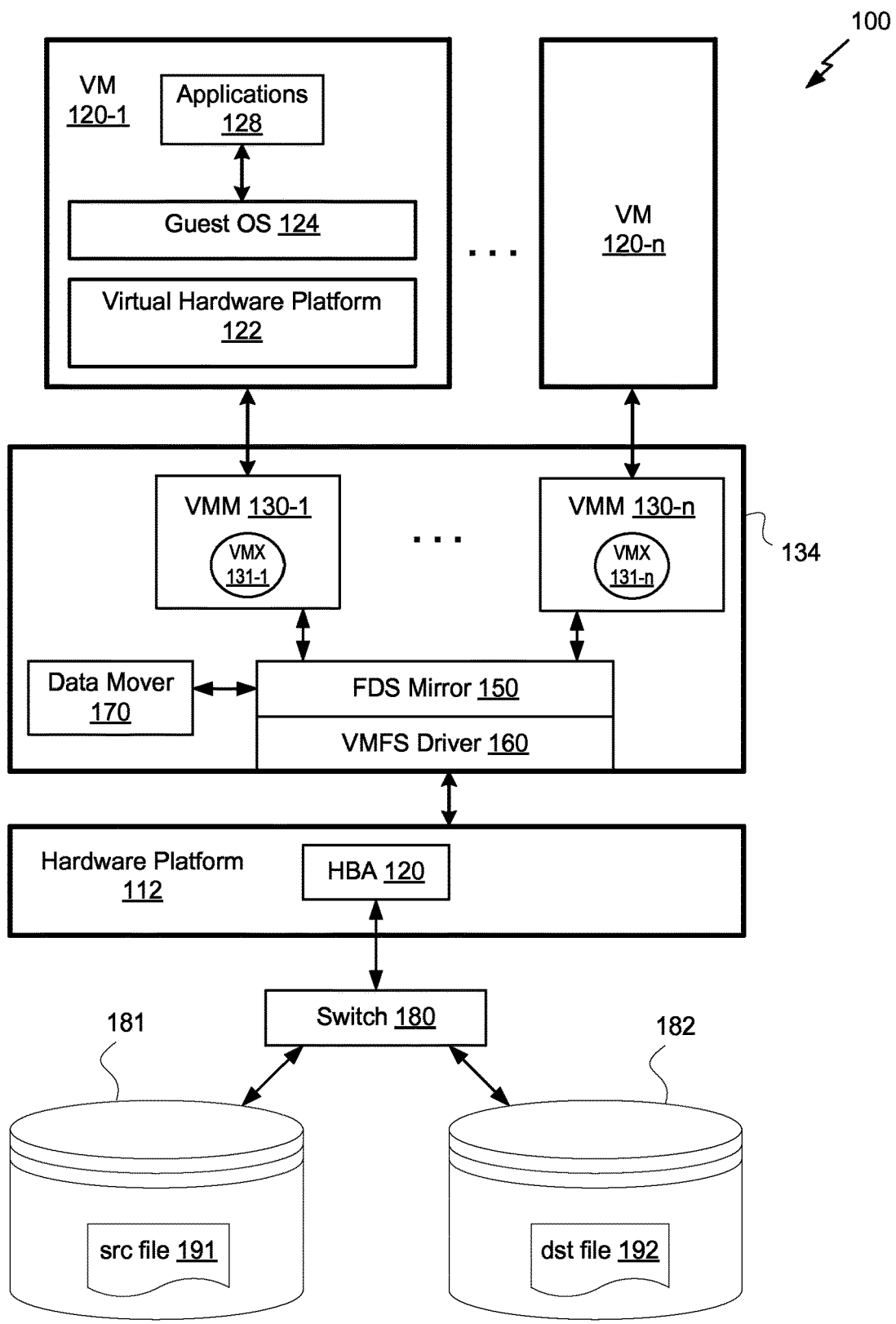
FIG. 1 is a block diagram of a virtualized computer system in which one or more embodiments of the present invention may be practiced.

FIG. 1 is a block diagram of a virtualized computer system in which one or more embodiments of the present invention may be practiced. Computer system 100 may be constructed on a conventional server-class, hardware platform 112 including one or more host bus adapters (HBA) 120 in addition to one or more central processing units, memory, and other standard peripheral components (not shown). Hardware platform 112 is coupled to a persistent storage system, which may be a network attached storage (NAS) device, storage area network (SAN) arrays, or any other similar storage arrays known to those with ordinary skill in the art. In the embodiment illustrated in FIG. 1, hardware platform 112 is coupled to SAN array 181 and SAN array 182 through a SAN switch 180.

Hypervisor 134 is installed on hardware platform 112 and supports a virtual machine execution space within which multiple VMs 120-1 through 120-n may be concurrently instantiated and executed. Hypervisor 134 includes virtual machine monitors (VMMs) 130-1 through 130-n, which map the physical resources of hardware platform 112 to virtual resources of the VMs 120-1 through 120-n, respectively, such that each VM 120 has its own virtual hardware platform 122. Each VM 120 further includes a guest operating system (OS) 124 that provides user-level applications 128 running in VM 120 an interface to the virtual hardware platform 122.

Input-output operations (IOs) generated by VMs 120 are passed down to a file system device switch (FDS) mirror module 150 and then to a virtual machine file system (VMFS) driver 160. FDS mirror module 150 manages mirroring of write IOs in accordance with one or more embodiments of the present invention. VMFS driver 160 manages access to files (e.g., virtual disks, etc.) stored in persistent storage systems, such as SAN arrays 181, 182. Data mover module 170 interfaces with FDS mirror module 150 and controls moving of data between SAN arrays, e.g., from SAN array 181 to SAN array 182. One example of a data mover module that may be used in the embodiments of the present invention is the data mover described in U.S. patent application Ser. No. 12/356,694, filed Jan. 21, 2009 and entitled "Data Mover for Computer System," the entire contents of which are incorporated by reference herein.

User-level processes VMX 131-1 through VMX 131-n are each shown as part of a corresponding VMM 130. In one embodiment, these processes are under the control of a system administrator through a virtualized infrastructure management software, which may be executed in a central server or alternatively, in a virtual machine running in a different host. One example of user-level processes is a process for live migration of VM persistent data, such as one or more virtual disks associated with a VM. Live migration of VM persistent data according to one or more embodiments of the present invention will be illustrated herein as a process for migrating a virtual disk associated with VM 120-1 from SAN array 181 to SAN array 182. The virtual disk being migrated is stored in SAN array 181 as a source file (src file) 191 and mirrored in SAN array 182 as a destination file (dst file) 192. In addition to src file 191 and dst file 192 residing on physically separate storage arrays, they are also stored in separate logical data storage units, known as logical unit number (LUNs). In addition to one or more virtual disks, persistent data associated with a VM may include swap files and snapshot files.

Figure 2:
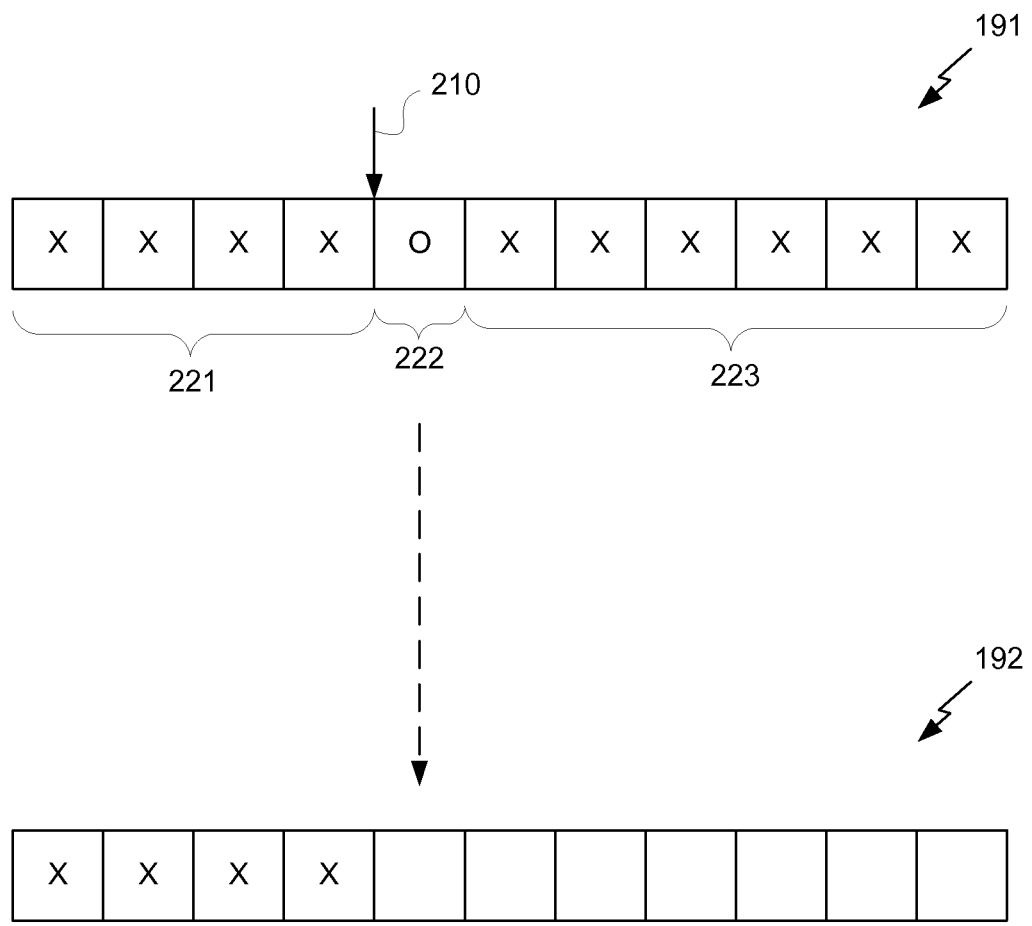
FIG. 2 is a schematic diagram of a virtual machine disk being migrated, according to one or more embodiments of the present invention.

FIG. 2 is a schematic diagram of a virtual machine disk being migrated, according to one or more embodiments of the present invention. For purposes of illustration, src file 191 and dst file 192 are shown as a linear array of data separated into a plurality of regions. The size of each region corresponds to a user-configurable copy size of data mover module 170, and each region of src file 191 shown in FIG. 2 contains multiple data blocks. In one embodiment, the copy size of data mover module 170 is configured to be 32 MB and each data block has the size of 1 MB. In the example shown in FIG. 2, data mover module 170 has completed copying the first four regions of src file 191 to dst file 192 and is currently working on copying the fifth region as indicated by a data mover pointer 210. As shown, data mover pointer 210 points to the beginning of the region that data mover module 170 is currently copying.

While data is being copied from the regions of src file 191 to dst file 192 as part of the migration process, it should be recognized that VM 120-1 may issue IOs. When this happens, FDS mirror module 150 makes a determination as to how to handle these IOs. First, all read IOs are allowed to go through. Second, all write IOs in regions 221 for which copying by data mover module 170 has already been performed are mirrored in dst file 192. Third, all write IOs in region 222 for which copying by data mover module 170 is currently being performed are deferred until the data mover pointer 210 points to a different region. When this write IO is eventually performed, it is mirrored in dst file 192. Fourth, all write IOs in region 223 for which copying by data mover module 170 has not yet been performed are allowed to go through without deferring and without mirroring in dst file 192. In some embodiments, FDS mirror module 150 may perform lazy mirroring of write IOs in region 223 to dst file 192. Data blocks that have been mirrored in such a manner are not copied during the subsequent copying by data mover module 170, so that the subsequent copying step can be completed more quickly. In order to detect what data blocks have been lazily mirrored, a bitmap of what data blocks of dst file 192 are currently in sync with data blocks of src file 191 is maintained. Data mover module 170 checks this bitmap and skips the data blocks of dst file 192 that are currently in sync with data blocks of src file 191.

According to one or more embodiments of the present invention, the order in which data blocks are copied from src file 191 to dst file 192 may be based on block addresses, or may be based on other factors, such as the relative activity level of the data blocks. When the relative activity level of the data blocks is taken into account in the ordering of data blocks for copying, the "cold" blocks, i.e., the ones with lower activity levels, are given higher priority for copying, and the "hot" blocks, i.e., the ones with higher activity levels, are given lower priority for copying. This scheme reduces the amount of writes to both src file 191 and dst file 192 because mirroring of hot blocks is moved toward the end of the virtual disk migration process. Techniques for determining the relative activity level of data blocks are described in U.S. patent application Ser. No. 12/881,992, filed Sep. 14, 2010 and entitled "Method and System for Optimizing Live Migration of Persistent Data of Virtual Machine Using Disk I/O Heuristics", the entire contents of which are incorporated by reference herein.

With the techniques described above, by the time data mover pointer 210 moves to the end of src file 191, dst file 192 will have a complete copy of the contents of src file 191 and an atomic switchover of the virtual machine disk from src file 191 to dst file 192 can take place with no downtime.

Figure 3:
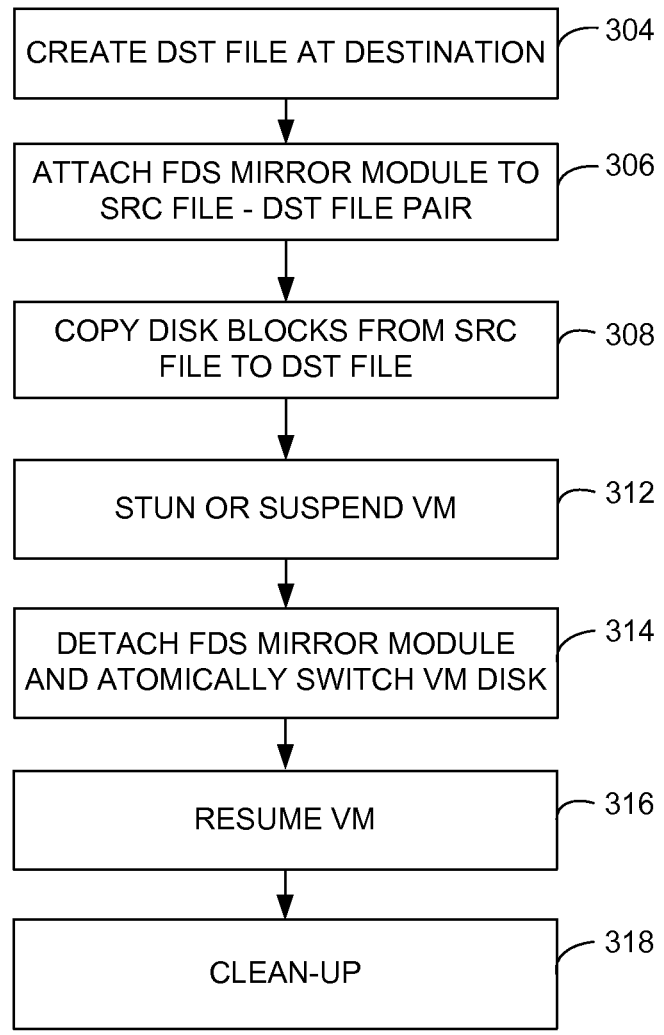
FIG. 3 is a flow diagram that illustrates the overall process of migrating persistent VM data from a source data store to a destination data store in accordance with one or more embodiments of the present invention.

FIG. 3 is a flow diagram that illustrates the overall process of migrating persistent VM data from a source data store to a destination data store in accordance with one or more embodiments of the present invention. In one embodiment, this process is carried out by hypervisor 134 running inside of computer system 100 illustrated in FIG. 1 to migrate the disk of VM 120-1, which is stored as src file 191, from SAN array 181 (source data store) to SAN array 182 (destination data store).

The process illustrated in FIG. 3 begins at step 304, where hypervisor 134 creates dst file 192 at SAN array 182. At step 306, hypervisor 134 attaches FDS mirror module to both src file 191 and dst file 192. In one embodiment, a fast suspend-resume technique described in U.S. patent application Ser. No. 12/559,489, filed Sep. 14, 2009 and entitled "Method of Suspending and Resuming Virtual Machines", the entire contents of which are incorporated by reference herein, is used to suspend VM 120-1 prior to this step and to resume VM 120-1 after this step. In virtualization systems that allow run-time changes to file handles, it is not necessary to suspend the virtual machine prior to performing this step. At step 308, data blocks associated with src file 191 are copied to dst file 192 by data mover module 170. If VM 120-1 issues IOs during this step, the IOs are handled by FDS mirror module 150 in the manner described above in conjunction with FIG. 2. In situations where a virtual machine disk comprises multiple files, each file is copied separately by data mover 170 in series or in parallel. After all regions of src file 191 have been copied to dst file 192, at step 312, VM 120-1 is suspended at step 312 to allow FDS mirror module 150 to be detached and an atomic switchover of the disk of VM 120-1 from src file 191 to dst file 192 can take place. At step 314, hypervisor 134 detaches FDS mirror module 150 from src file 191 and dst file 192, and atomically switches over the disk for VM 120-1 from src file 191 to dst file 192. VM 120-1 is resumed at step 316 and clean-up occurs in step 318. As part of the clean-up, src file 191 and associated data structures are deleted. In one embodiment, VM 120-1 is suspended at step 312 and resumed at step 316 according to the fast suspend-resume technique described in U.S. patent application Ser. No. 12/559,489.

Figure 4:
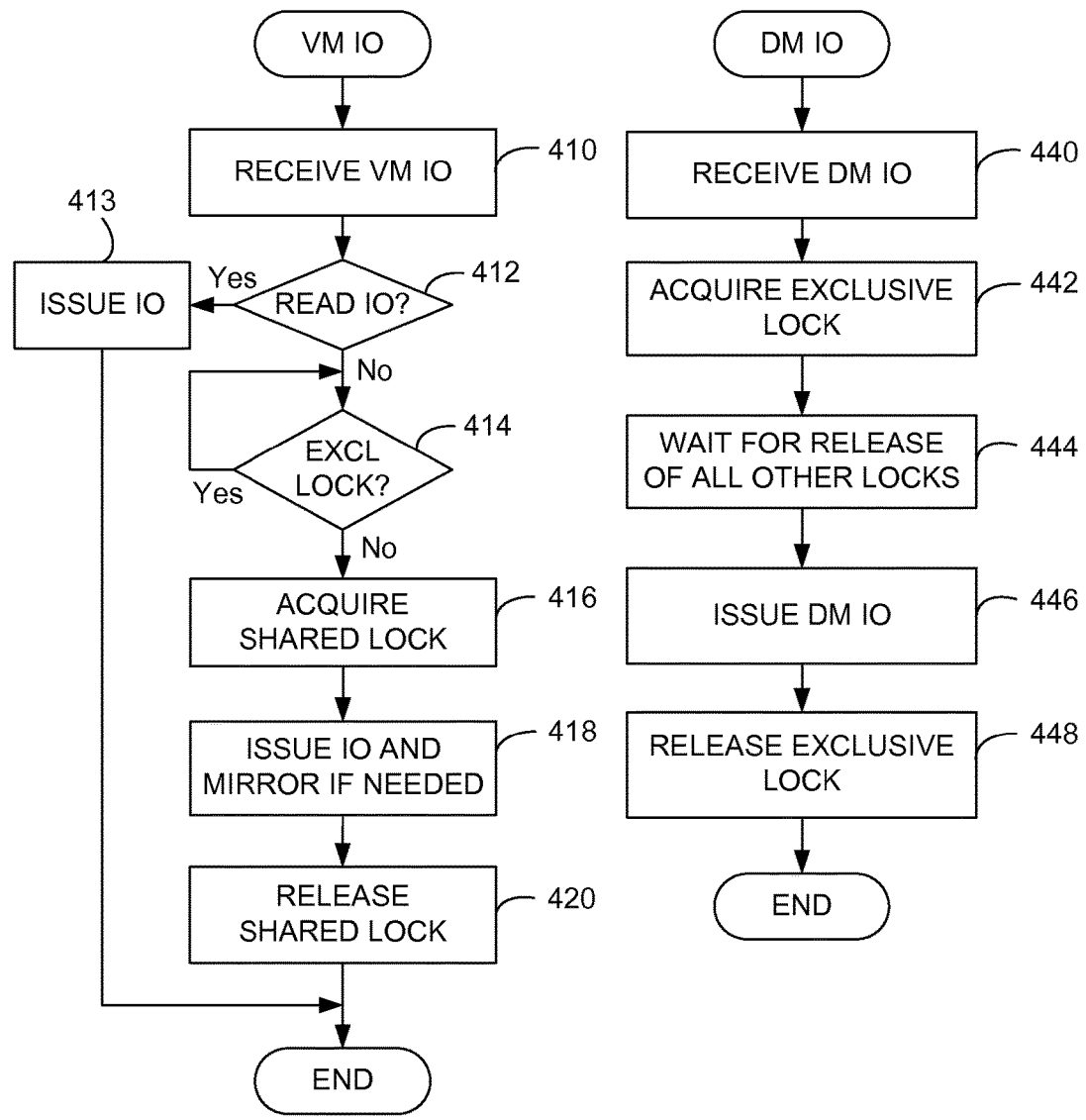
FIG. 4 are flow diagrams that illustrate the process of migrating persistent VM data from a source data store to a destination data store using mirrored IOs according to a first embodiment of the present invention.

FIG. 4 are flow diagrams that illustrate the process of migrating persistent VM data from a source data store to a destination data store using mirrored IOs according to a first embodiment of the present invention. This first embodiment employs exclusive locking of src file 191 to ensure that no write IOs are being performed on the region of src file 191 that is being copied by data mover module 170. The VM IO flow diagram includes steps carried out by FDS mirror module 150 in response to an IO requested by VM 120-1. The DM IO flow diagram includes steps carried out by FDS mirror module 150 in response to an IO requested by VMX 131-1.

When an IO is requested by VM 120-1, FDS mirror module 150 receives the IO at step 410 and checks to see if it is a read IO a step 412. A read IO is allowed to pass through FDS mirror module 150 and issued. Thus, if the IO is determined to be a read IO at step 412, the IO is issued at step 413. If the IO is determined not to be a read IO at step 412, FDS mirror module 150 attempts to acquire a shared lock to src file 191. At step 414, FDS mirror module 150 determines if an exclusive lock to src file 191 has been acquired, e.g., in accordance with step 442 described below. If the exclusive lock to src file 191 has been acquired, FDS mirror module 150 waits for its release. When the exclusive lock to src file 191 has been released, FDS mirror module 150 acquires a shared lock to src file 191 at step 416. Then, at step 418, FDS mirror module 150 allows the IO to be issued and also mirrors the IO at dst file 192 if the IO is in region 221. At step 420, upon completion of the IO, FDS mirror module 150 releases the shared lock.

A separate flow diagram is illustrated for DM IOs, because a data mover IO is requested by VMX 131-1 asynchronously with respect to the VM IOs. When a data mover IO is requested by VMX 131-1, FDS mirror module 150 receives the IO at step 440 and acquires an exclusive lock to src file 191 at step 442. The acquiring of the exclusive lock prevents any other locks to src file 191, e.g., shared locks in accordance with step 416 described above, to be acquired. At step 444, FDS mirror module 150 waits for all other locks to src file 191 previously acquired, e.g., any shared lock acquired by FDS mirror module 150 in step 416, to be released. Once all other locks have been released, step 446 is executed, where the data mover IO is issued to data mover module 170. After the data mover IO is completed, FDS mirror module 150 releases the exclusive lock at step 448.

Figure 5:
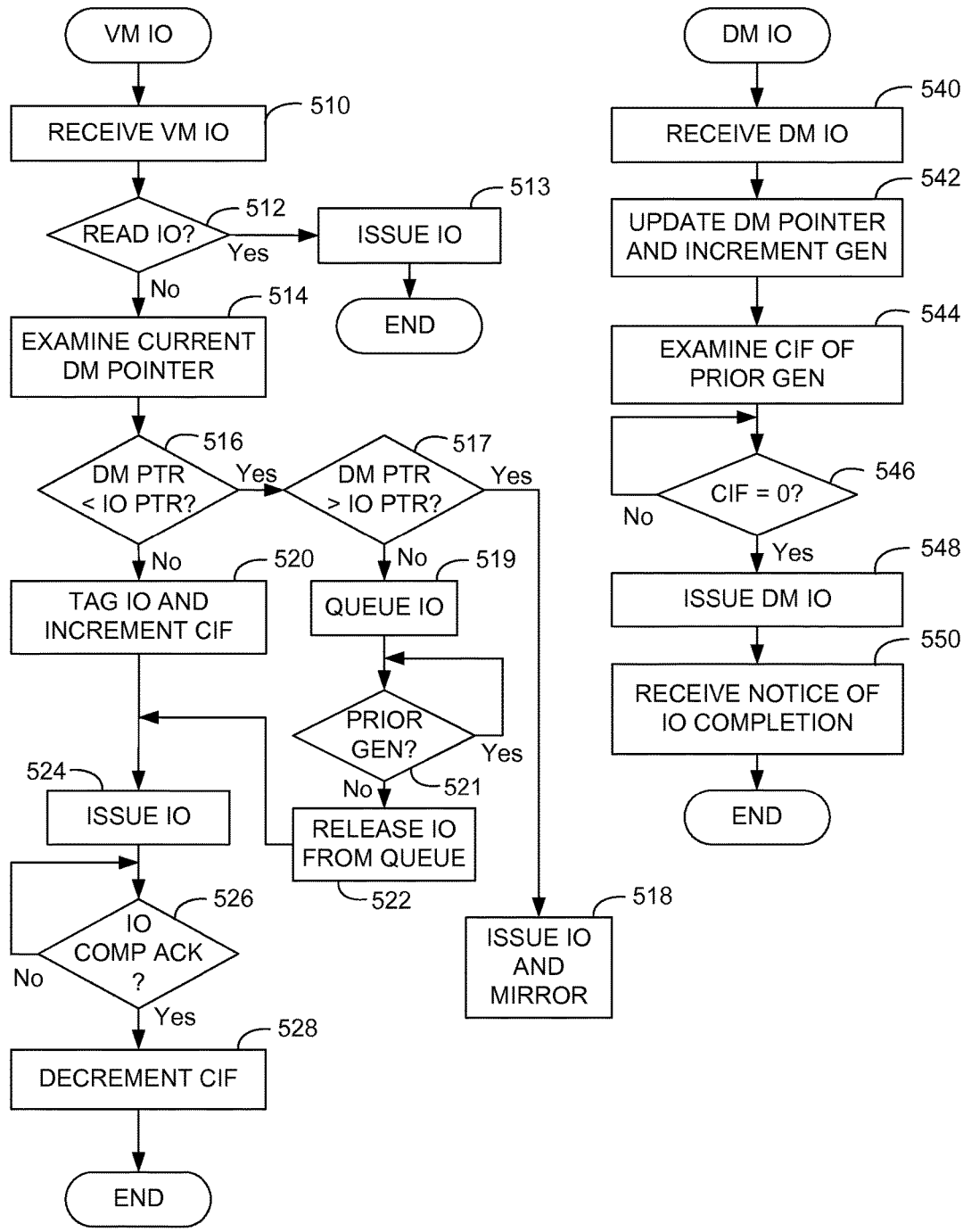
FIG. 5 are flow diagrams that illustrate the process of migrating persistent VM data from a source data store to a destination data store using mirrored IOs according to a second embodiment of the present invention.

FIG. 5 are flow diagrams that illustrate the process of migrating persistent VM data from a source data store to a destination data store using mirrored IOs according to a second embodiment of the present invention. This second embodiment does not rely on exclusive locking of src file 191 so that src file 191 can be accessed by VM 120-1 during copying by data mover module 170. The VM IO flow diagram includes steps carried out by FDS mirror module 150 in response to an IO requested by VM 120-1. The DM IO flow diagram includes steps carried out by FDS mirror module 150 in response to an IO requested by VMX 131-1. The steps of FIG. 5 rely on values of several variables. The first is the generation number (GEN) that is incremented each time data mover module 170 initiates copying of a new region. The second is a count of commands-in-flight (CIF). This represents the number of write IOs that are currently pending (i.e., issued and not completed). A separate CIF count is maintained for at least the current generation number and the immediately prior generation number.

When an IO is requested by VM 120-1, FDS mirror module 150 receives the IO at step 510 and checks to see if it is a read IO a step 512. A read IO is allowed to pass through FDS mirror module 150 and issued. Thus, if the IO is determined to be a read IO at step 512, the IO is issued at step 513. If the IO is determined not to be a read IO at step 512, FDS mirror module 150 examines the current position of data mover pointer 210 (DM PTR) at step 514 and compares it with the location of src file 191 where the IO will be performed (IO PTR) at steps 516 and 517.

If DM PTR has not yet reached the region of IO PTR (DM PTR<IO PTR), the IO is tagged with the current generation number and the CIF of the current generation number is incremented at step 520. Then, at step 524, the IO is issued. If it is determined at step 526 that an acknowledgement of completion of the IO issued at step 524 is received, the method proceeds to step 528, where the CIF of the current generation number is decremented.

If DM PTR has progressed beyond IO PTR (DM PTR>IO PTR), the IO is issued and mirrored at dst file 192 (step 518).

If IO PTR is currently in the region where copying is being carried out by data mover module 170 (DM PTR=IO PTR), the IO is queued for as long as the current generation number is the same as the generation number tagged on the IO (steps 519 and 521). When the current generation number is incremented as a result of a new DM IO being issued, e.g., in accordance with step 542 described below, such that the generation number tagged on the IO becomes a prior generation number, the IO queued at step 519 is released at step 522 and the method proceeds to steps 524, 526, and 528 described above.

A separate flow diagram is illustrated for DM IOs, because a data mover IO is requested by VMX 131-1 asynchronously with respect to the VM IOs. When a data mover IO is requested by VMX 131-1, FDS mirror module 150 receives the IO at step 540. At step 542, FDS mirror module 150 updates data mover pointer 210 and increments the generation number. At step 544, FDS mirror module 150 examines the CIF count associated with the prior generation number. If that count is zero, as determined at step 546, the data mover IO is issued to data mover module 170 (step 548). Upon completion of the issued data mover IO, FDS mirror module 150 receives a notice of completion at step 550.

Figure 6:
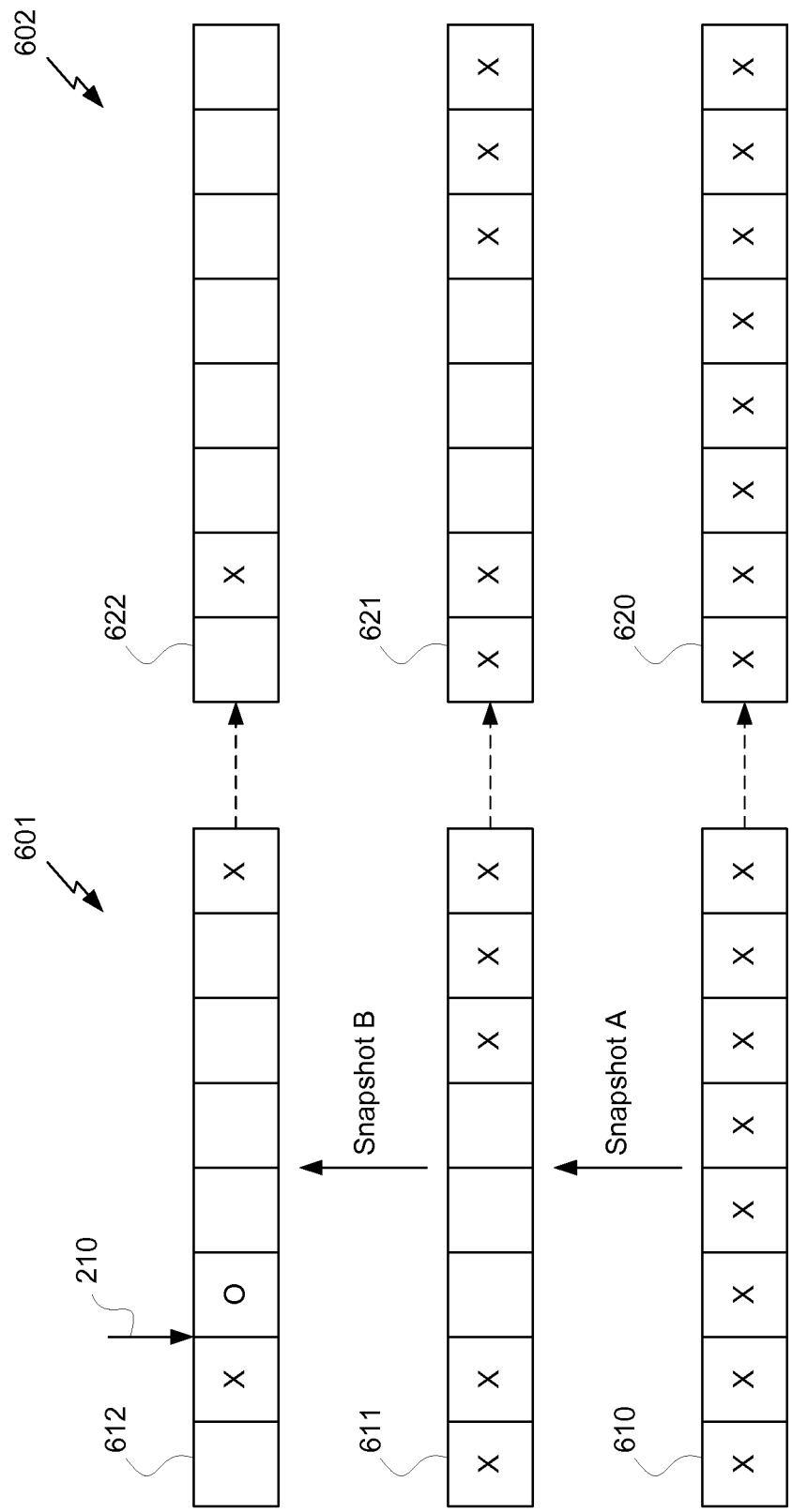
FIG. 6 is a schematic diagram of multiple files representing a virtual machine disk being migrated, according to one or more embodiments of the present invention.

FIG. 6 is a schematic diagram of multiple files representing a virtual machine disk being migrated, according to one or more embodiments of the present invention. In this example, files 610, 611, 612 are stored in SAN array 181 and represent the disk for VM 120-1, and files 620, 621, 622 are stored in SAN array 182 and represent the destination files to which the disk for VM 120-1 will be migrated. File 610 represents the base disk for VM 120-1 and files 611, 612 are delta disks representing two snapshots A and B. Snapshot A stores writes to the base disk after the creation of snapshot A. Snapshot B stores writes to the base disk after the creation of snapshot B. When the disk for VM 120-1 represented by files 610, 611, 612 is to be migrated from SAN array 181 to SAN array 182, the base disk represented by file 610 is first copied. Then, snapshot A represented by file 611 is copied. These two copy steps do not need to account for write IOs issued by VM 120-1 during the copying process because any such write IOs will be written to file 612 and will not touch files 610, 611. When the copy process moves onto file 612, either the method of FIG. 5 or the method of FIG. 6 is used to account for write IOs issued by VM 120-1 during the copying process. It should be recognized that file 612 should be copied relatively quickly because file 612 only contains the most recent changed blocks of the disk for VM 120-1.

The virtual machine disk migration techniques that use mirrored IOs, as described herein, provide several advantages over iterative disk pre-copy techniques. One is predictability. The mirrored IO technique does not employ iterations, which means that the disk migration time can be predicted with some level of accuracy. Another is low cost. If disk IO heuristics information taught in U.S. patent application Ser. No. 12/881,992 is used to optimize the copying process, significant cost gains can be achieved by reducing the number of IOs on the storage system, while reducing the time required to perform the virtual machine disk migration.

The various embodiments described herein may employ various computer-implemented operations involving data stored in computer systems. For example, these operations may require physical manipulation of physical quantities—usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system—computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs)—CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Virtualization systems in accordance with the various embodiments may be implemented as hosted embodiments, non-hosted embodiments or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claims(s).

We claim:

1. A method of migrating contents of persistent storage from a source object to a destination object, comprising:

establishing copying priorities, wherein regions of a source object with lower activity levels are given higher priority for copying than regions of the source object with higher levels of activity;

setting a generation number of a data mover pointer, wherein the generation number is a variable;

selecting a region of the source object to be copied based on the copying priority and moving the data mover pointer to the position of the selected region;

incrementing the generation number of the data mover pointer each time copying of a new region of the source object is initiated by a data mover input-output operation (IO);

copying the selected region to the destination object;

repeating said selecting and said copying of a region and said incrementing of the generation number of the data mover pointer until all regions of the source object have been copied to the destination object, wherein regions with higher priority for copying are selected and copied before regions with lower priority for copying; and wherein the source object is a first file representing a virtual disk of a virtual machine and the destination object is a second file to which the contents of the first file are to be copied; and when a write IO is requested on the source object before all regions of the source object have been copied, then:
tagging the write IO with the generation number of the data mover pointer that corresponds to the currently selected region of the source object; and
if the write IO is in a region of the source object with a position less than the data mover position, mirroring the write IO on the destination object;
if the write IO is in a region of the source object with a position greater than the data mover position, not mirroring the write IO on the destination object; and
if the write IO is in a region of the source object with a position that is equal to the data mover position, deferring the write IO until the generation number of the data mover pointer is incremented such that the generation number of the data mover pointer is no longer the same as the generation number of the write IO;
wherein data mover IOs are requested asynchronously from write IOs.

2. The method of claim 1, further comprising:
acquiring a shared lock to the source object prior to performing the write IO on the source object.

3. The method of claim 2, further comprising:
waiting for an exclusive lock to the source object to be released prior to acquiring the shared lock to the source object.

4. The method of claim 3, further comprising:
prior to said copying, acquiring the exclusive lock to the source object that does not permit new shared locks to the source object to be acquired; and
after said copying releasing the exclusive lock.

5. The method of claim 1, further comprising:
prior to performing the write TO on the source object, examining the location of the source object at which the write TO is to be performed,
wherein the write TO on the source object is performed if the location is not in the region of the source object for which said copying is currently being carried out.

6. The method of claim 5, wherein the write TO on the source object is added to a queue if the location is in the region of the source object for which copying to the destination object is currently being carried out.

7. The method of claim 6, wherein the write TO on the source object is released from the queue when said copying has completed.

8. The method of claim 1, wherein the regions with lower activity levels are selected prior to the regions with higher activity levels.

9. The method of claim 1, further comprising:
performing an atomic switchover of the virtual disk of said virtual machine from the source object to the destination object after all regions of the source object have been copied to the destination object.

10. The method of claim 1, wherein the source object and the destination object are stored in different LUNs.

11. The method of claim 1, wherein the source object and the destination object are stored in different physical storage arrays.

12. The method of claim 1, wherein the source object further includes a swap file of the virtual machine and a snapshot file of the virtual machine.

13. A method of migrating contents of a virtual machine disk from a source storage system to a destination storage system, comprising:
establishing copying priorities, wherein regions of the source storage system with lower activity levels are given higher priority for copying than regions of the source storage system with higher levels of activity;
setting a generation number of a data mover pointer, wherein the generation number is a variable;
selecting a region of the source storage system to be copied based on the copying priority and moving the data mover pointer to the position of the selected region;
incrementing the generation number of the data mover pointer each time copying of a new region of the source object is initiated by a data mover input-output operation (IO);
copying the selected region to a new virtual machine disk at the destination storage system;
repeating said selecting and said copying of a region and said incrementing of the generation number of the data mover pointer until all regions of the virtual machine disk have been copied, wherein regions with higher priority for copying are selected and copied before regions with lower priority for copying; and
when a write IO is requested on the source storage system before all regions of the source storage system have been copied, then
tagging the write IO with the generation number of the data mover pointer that corresponds to the currently selected region of the source object; and
if the write IO is in a region of the virtual machine disk with a position less than the data mover position, mirroring the write IO on the new virtual machine disk;
if the write IO is in a region of the virtual machine disk with a position greater than the data mover position, not mirroring the write IO on the new virtual machine disk; and
if the write IO is in a region of the virtual machine disk with a position that is equal to the data mover position, deferring the write IO until the generation number of the data mover pointer is incremented such that the generation number of the data mover pointer is no longer the same as the generation number of the write IO;
wherein data mover IOs are requested asynchronously from write IOs.

14. The method of claim 13, further comprising:
prior to performing the write TO on the virtual machine disk, examining the location of the virtual machine disk at which the write TO is to be performed,
wherein the write TO on the virtual machine disk is performed if the location is not in the region of the virtual machine disk for which said copying is currently being carried out.

15. The method of claim 14, wherein the write TO on the virtual machine disk is added to a queue if the location is in the region of the virtual machine disk for which copying is currently being carried out.

16. The method of claim 15, wherein the write TO on the virtual machine disk is released from the queue when said copying has completed.

17. A non-transitory computer readable storage medium storing instructions which, when executed in a computer system, causes the computer system to carry out the steps of:

establishing copying priorities, wherein regions of a source object with lower activity levels are given higher priority for copying than regions of the source object with higher levels of activity;

setting a generation number of a data mover pointer, wherein the generation number is a variable;

selecting a region of the source object to be copied based on the copying priority and moving the data mover pointer to the position of the selected region;

incrementing the generation number of the data mover pointer each time copying of a new region of the source object is initiated by a data mover input-output operation (IO);

copying the selected region to the destination object;

repeating said selecting and said copying of a region and said incrementing of the generation number of the data mover pointer until all regions of the source object have been copied to the destination object, wherein regions with higher priority for copying are selected and copied before regions with lower priority for copying; and when a write TO is requested on the source object before all regions of the source object have been copied, then:
  tagging the write TO with the generation number of the data mover pointer that corresponds to the currently selected region of the source object; and
  if the write TO is in a region of the source object with a position less than the data mover position, mirroring the write TO on the destination object;
  if the write TO is in a region of the source object with a position greater than the data mover position, not mirroring the write TO on the destination object; and
  if the write TO is in a region of the source object with a position that is equal to the data mover position, deferring the write TO until the generation number of the data mover pointer is incremented such that the generation number of the data mover pointer is no longer the same as the generation number of the write TO;

wherein the source object is a first file representing a virtual disk of a virtual machine and the destination object is a second file to which the contents of the first file are to be copied and wherein data mover IOs are requested asynchronously from write IOs.

18. The non-transitory computer readable storage medium of claim 17, wherein the instructions, when executed in the computer system, causes the computer system to carry out the steps of:
  performing an atomic switchover of the virtual disk of said virtual machine from the source object to the destination object after all regions of the source object have been copied to the destination object.

19. The method of claim 1, wherein the region of the selected source object is the region with the least activity among a plurality of other regions that have not yet been selected.

* * * * *